(12) United States Patent
Branch et al.

(10) Patent No.: US 8,347,285 B2
(45) Date of Patent: Jan. 1, 2013

(54) EMBEDDED AGENT FOR SELF-HEALING SOFTWARE

(75) Inventors: Robert A. Branch, Portland, OR (US); Joshua Boelter, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 939 days.

(21) Appl. No.: 11/014,388

(22) Filed: Dec. 16, 2004

(65) Prior Publication Data

US 2006/0136892 A1    Jun. 22, 2006

(51) Int. Cl.
*G06F 9/445* (2006.01)

(52) U.S. Cl. ........ 717/177; 717/168; 717/170; 717/171; 717/175

(58) Field of Classification Search .................. 717/168, 717/174
See application file for complete search history.

(56) References Cited

U.S. PATENT DOCUMENTS

| | | | | |
|---|---|---|---|---|
| 5,745,753 A * | 4/1998 | Mosher, Jr. | ................... | 707/610 |
| 5,799,322 A * | 8/1998 | Mosher, Jr. | ........................... | 1/1 |
| 6,363,495 B1 * | 3/2002 | MacKenzie et al. | ........... | 714/4.5 |
| 6,640,334 B1 * | 10/2003 | Rasmussen | ................... | 717/171 |
| 6,732,267 B1 * | 5/2004 | Wu et al. | ....................... | 713/100 |
| 6,816,964 B1 * | 11/2004 | Suzuki et al. | ...................... | 713/2 |
| 6,834,384 B2 * | 12/2004 | Fiorella et al. | ................. | 717/169 |
| 6,941,453 B2 * | 9/2005 | Rao | ..................................... | 713/2 |
| 6,957,186 B1 * | 10/2005 | Guheen et al. | ................. | 705/323 |
| 7,028,304 B1 * | 4/2006 | Weinberger et al. | ........... | 719/310 |
| 7,089,547 B2 * | 8/2006 | Goodman et al. | ............. | 717/168 |
| 7,197,634 B2 * | 3/2007 | Kruger et al. | ...................... | 713/1 |
| 7,251,812 B1 * | 7/2007 | Jhanwar et al. | ................. | 717/171 |
| 7,325,047 B2 * | 1/2008 | Brittenham et al. | ........... | 709/220 |
| 2003/0041094 A1 * | 2/2003 | Lara et al. | ....................... | 709/201 |
| 2003/0041127 A1 * | 2/2003 | Turnbull | ......................... | 709/220 |
| 2004/0024917 A1 * | 2/2004 | Kennedy et al. | .................... | 710/1 |
| 2004/0034861 A1 * | 2/2004 | Ballai | ............................ | 719/321 |
| 2004/0093597 A1 * | 5/2004 | Rao et al. | ........................ | 717/171 |
| 2004/0107383 A1 * | 6/2004 | Bouchier et al. | .................... | 714/4 |
| 2004/0194081 A1 * | 9/2004 | Qumei et al. | ................... | 717/173 |
| 2004/0226008 A1 * | 11/2004 | Jacobi et al. | ................... | 717/168 |
| 2004/0237068 A1 * | 11/2004 | Ren | ................................ | 717/110 |
| 2005/0097543 A1 * | 5/2005 | Hirayama | ....................... | 717/168 |
| 2005/0204351 A1 * | 9/2005 | Jiang et al. | ..................... | 717/162 |
| 2005/0246703 A1 * | 11/2005 | Ahonen | .......................... | 717/172 |
| 2005/0268296 A1 * | 12/2005 | Marolia et al. | ................. | 717/168 |
| 2006/0080656 A1 * | 4/2006 | Cain et al. | ...................... | 717/174 |
| 2006/0080665 A1 * | 4/2006 | Chavoustie et al. | ........... | 718/104 |
| 2006/0178918 A1 * | 8/2006 | Mikurak | ............................ | 705/7 |
| 2007/0245170 A1 * | 10/2007 | Crowell et al. | .................. | 714/36 |

* cited by examiner

*Primary Examiner* — Isaac Tecklu

(74) *Attorney, Agent, or Firm* — Blakely, Sokoloff, Taylor & Zafman LLP

(57) ABSTRACT

The present disclosure relates to attempting to maintain and/or repair the embedded software components of a computer and, more specifically, to attempting to maintain and/or repair the embedded software components of a server utilizing a service processor.

17 Claims, 2 Drawing Sheets

EMBEDDED AGENT FOR SELF-HEALING SOFTWARE

BACKGROUND

1. Field

The present disclosure relates to attempting to maintain and/or repair the embedded software components of a computer and, more specifically, to attempting to maintain and/or repair the embedded software components of a server utilizing a service processor.

2. Background Information

Computers in general, and server platforms specifically, often include many embedded, field-upgradeable, software components, such as, for example Basic Input Output System (BIOS) firmware, server management firmware, sensor data records, embedded web pages, etc. These components are often stored within a flash memory; however, storage within another form of memory is possible.

Often these embedded software modules need to be upgraded or otherwise altered throughout the computer's product life-cycle. This occurs more frequently when the computer is a server. The alterations in the embedded software may occur for reasons such as, for example, to resolve defects or to integrate additional functionality.

Traditionally, the process of updating the embedded software included in the platform is initiated by the system administrator. The administrator identifies that an update is available often by either contacting technical support, searching the web, receiving an email message, etc. In some cases, an agent resident in the operating system, such as, for example, Windows Update, may be used to automate the process of identifying that a software update is available.

Once the availability of the update has been identified, the administrator may choose "how" and "when" to apply the update to the computer platform. In the case of an operating system agent, such as, for example, Windows Update, this process may be automated by setting a policy to automatically download and apply the update. However, Windows Update is designed primarily to update non-embedded software that executes within the operating system.

Unfortunately, the updating of the embedded software often includes either a manual process, such as, the intervention of a system administrator, is operating system dependent, such as, Windows Update, or does not address the updating of embedded software, such as, Windows Update. A technique is needed therefore, to address at least these issues.

BRIEF DESCRIPTION OF THE DRAWINGS

Subject matter is particularly pointed out and distinctly claimed in the concluding portions of the specification. The claimed subject matter, however, both as to organization and the method of operation, together with objects, features and advantages thereof, may be best understood by a reference to the following detailed description when read with the accompanying drawings in which:

DETAILED DESCRIPTION

In the following detailed description, numerous details are set forth in order to provide a thorough understanding of the present claimed subject matter. However, it will be understood by those skilled in the art that the claimed subject matter may be practiced without these specific details. In other instances, well-known methods, procedures, components, and circuits have not been described in detail so as to not obscure the claimed subject matter.

Figure 1:
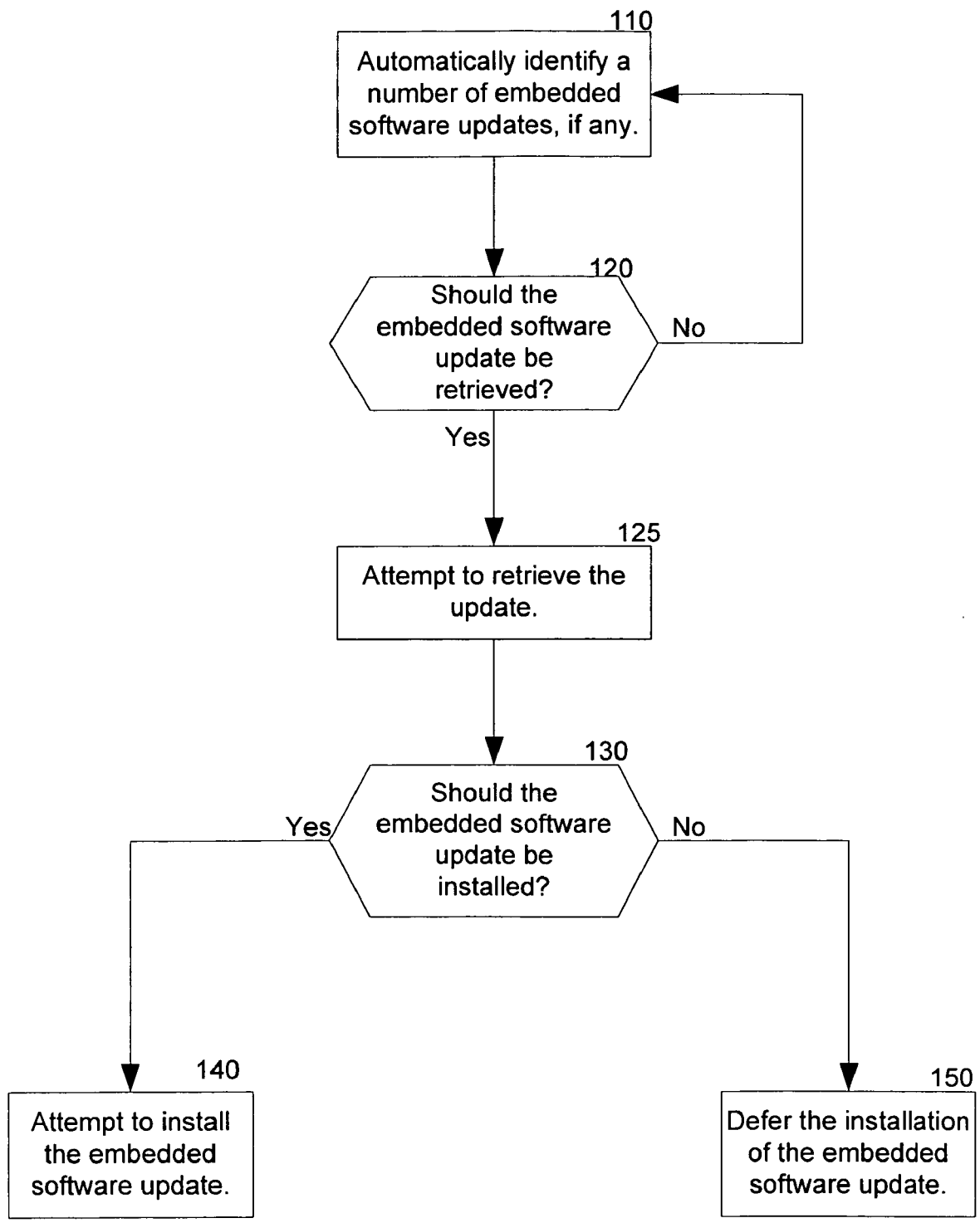
FIG. 1 is a flowchart illustrating an embodiment of a technique for attempting to maintain and/or repair the embedded software components of a computer in accordance with the claimed subject matter.

FIG. 1 is a flowchart illustrating an embodiment of a technique for attempting to maintain and/or repair the embedded software components of a computer in accordance with the claimed subject matter. In one embodiment, the technique may be included in a software, hardware, firmware, or combination thereof, agent that is embedded within a service processor. In another embodiment, the agent may reside outside of the service processor.

In one embodiment, the computer may include a computer platform or computer device. In one embodiment, the computer platform may include a personal computer, or laptop. In another embodiment, the computer may include a server. In yet another embodiment, the computer platform may include a mobile device. Examples of mobile devices, which the disclosed subject matter is not limited to, may include a cellular phone, a personal digital assistant (PDA), a wristwatch or a palmtop personal computer. Of course, one skilled in the art will realize other devices, which may be considered mobile devices in this context. In another embodiment, the computer platform may include a special purpose device. Examples of special purpose devices, which the disclosed subject matter is not limited to, may include a network router, a network switch, an automated teller, an automated point of sales device, or a telephone system. Of course, one skilled in the art will realize other devices, which may be considered special purpose devices in this context.

Block 110 illustrates that in one embodiment, the technique may include automatically identifying a number of embedded software updates. In one embodiment, the identification may involve querying a central software repository. In another embodiment, the information related to the software updates may reside on several different servers. It is contemplated that, in various embodiments, the software repositories may reside within an intranet or on the Internet. In yet another embodiment, the information related to the software updates may reside within a file on the computer platform. In one embodiment, the file may be received via a network interface. In another embodiment, the method of communication may include a secure protocol, such as for example, Secured Sockets Layer (SSL).

In one embodiment, the technique may utilize a database of all, or a portion of the, embedded software utilized by the host computer platform. In another embodiment, the technique may query the host platform to determine the embedded software utilized by the host platform. It is contemplated that this may occur in order to build the database or may occur just prior to attempting to identify the possible embedded software updates.

In one embodiment, a number of agents performing the illustrated technique may communicate with each other in order to perform the technique. It is contemplated that this communication may occur in a coordinated fashion, ad-hoc fashion, or mixture thereof. In one embodiment, the identification and/or retrieval of updates may involve utilizing other embodiments or instantiations of the agents. In one specific embodiment, a first agent may contact a database to identify and retrieve any available updates. A second agent may then contact the first agent, instead of the database, in order to perform the technique illustrated by FIG. 1. It is contemplated that embodiments may exist utilizing any number of agents. It is also contemplated that embodiments may exist wherein the second agent communicates with the database for some updates and the first agent for others. It is also contemplated that the second agent may communicate with the database to identify updates, but communicate and utilize the first agent to retrieve the updates. Of course, one skilled in the art will realize other variations of this embodiment may exist and are within the scope of the disclosed subject matter.

In one embodiment, the technique may check for updates on a periodic basis. In another embodiment, the technique may check for updates when the host computer platform is sufficiently idle, such as, for example, network usage is low, main CPU usage is low, service processor usage is low.

In one embodiment, if an update is available, the technique may alert a user, such as, for example, a system administrator, or other software agent that an update exists. In one embodiment, the alert may include an email message, a Simple Network Management Protocol (SNMP) trap, an alphanumeric page, or other proprietary format; however, these are merely a few non limiting examples.

In one embodiment, the types of updates that may be checked may be configurable, or in another embodiment based upon a policy established by a user. In one embodiment, the polling policy may also be configurable. It is contemplated that there are times when no embedded software updates may be available.

Block 120 illustrates that, in one embodiment, a determination may be made whether or not the software update may be retrieved. In one embodiment, determination may be made with the aid of a user, such as, for example, a system administrator, or other software agent. In one embodiment, the consultation may include an email message, a Simple Network Management Protocol (SNMP) trap, an alphanumeric page, or other proprietary format; however, these are merely a few none limiting examples. In another embodiment, the determination may include the use of a predetermined or hierarchal policy based scheme.

Block 125 illustrated, that if the update should be retrieved, an attempt to retrieve the update may be made. In one embodiment, the embedded software update may be retrieved via downloading the update over a network. In one embodiment, the download may occur utilizing a service processor with little, if any, assistance from the computer platform's main processor. In another embodiment, the update may be retrieved from the software repository described above, or alternately utilizing a different source.

If it is determined that the update not be retrieved, or the attempt to retrieve the update was unsuccessful, in one embodiment, the technique may continue to attempt to identify updates for the embedded software of the host platform. In one embodiment, a previously identified, but not retrieved, update may be ignored during the action illustrated by Block 110. In another embodiment, the updates may only be ignored for a predetermined length of time, or until another condition has occurred.

If the update was retrieved, Block 130 illustrated that, in one embodiment, a determination may be made as to whether or not the embedded software update should be installed. In one embodiment, the determination may be made, at least in part, utilizing a policy management scheme, a user, such as for example, a system administrator, or a remote (or local) management console; however, these are merely a few non-limiting examples.

In one embodiment, the update may be verified before installation. In one specific embodiment, a database may indicate that an update is available and relevant. The update may be retrieved. However, after retrieval the update may be determined to irrelevant or otherwise not applicable. In another embodiment, the update may be rejected if the update cannot be authenticated as coming from a trusted source. For example, an update may include a hash code that indicates that the integrity of the data in the update has not been violated. In one embodiment, the determination of validity may be made, at least in part, utilizing a policy management scheme, a user, such as for example, a system administrator, or a remote (or local) management console; however, these are merely a few non-limiting examples.

Block 140 illustrates that, in one embodiment, if the update is to be installed, an attempt may be made to install the update. In one embodiment, the update may be installed utilizing a service processor. In one embodiment, the installation may occur and take effect while the computer platform is operating normally. In another embodiment, the installation may occur while the platform is operating normally, but may not take effect until the platform is rebooted or reinitialized.

Block 150 illustrates that, in one embodiment, if it is not desirable to install the update, the installation may be deferred. In one embodiment, the installation may be deferred until the host computer platform is rebooted or reinitialized. In a specific embodiment, the installation may occur after the main operating system has ceased running, but before the platform reset or power off signal has been applied. In another embodiment, the installation may be deferred until an affirmative action is taken by a user, such as, for example a system administrator. In yet another embodiment, the installation may be deferred until a signal is received from a policy management system, or other external source.

In one embodiment, the installation of the update may be deferred essentially indefinitely. In a specific embodiment, this may include deleting the retrieved update. In another embodiment, the retrieved update may be stored pending further instruction.

Figure 2:
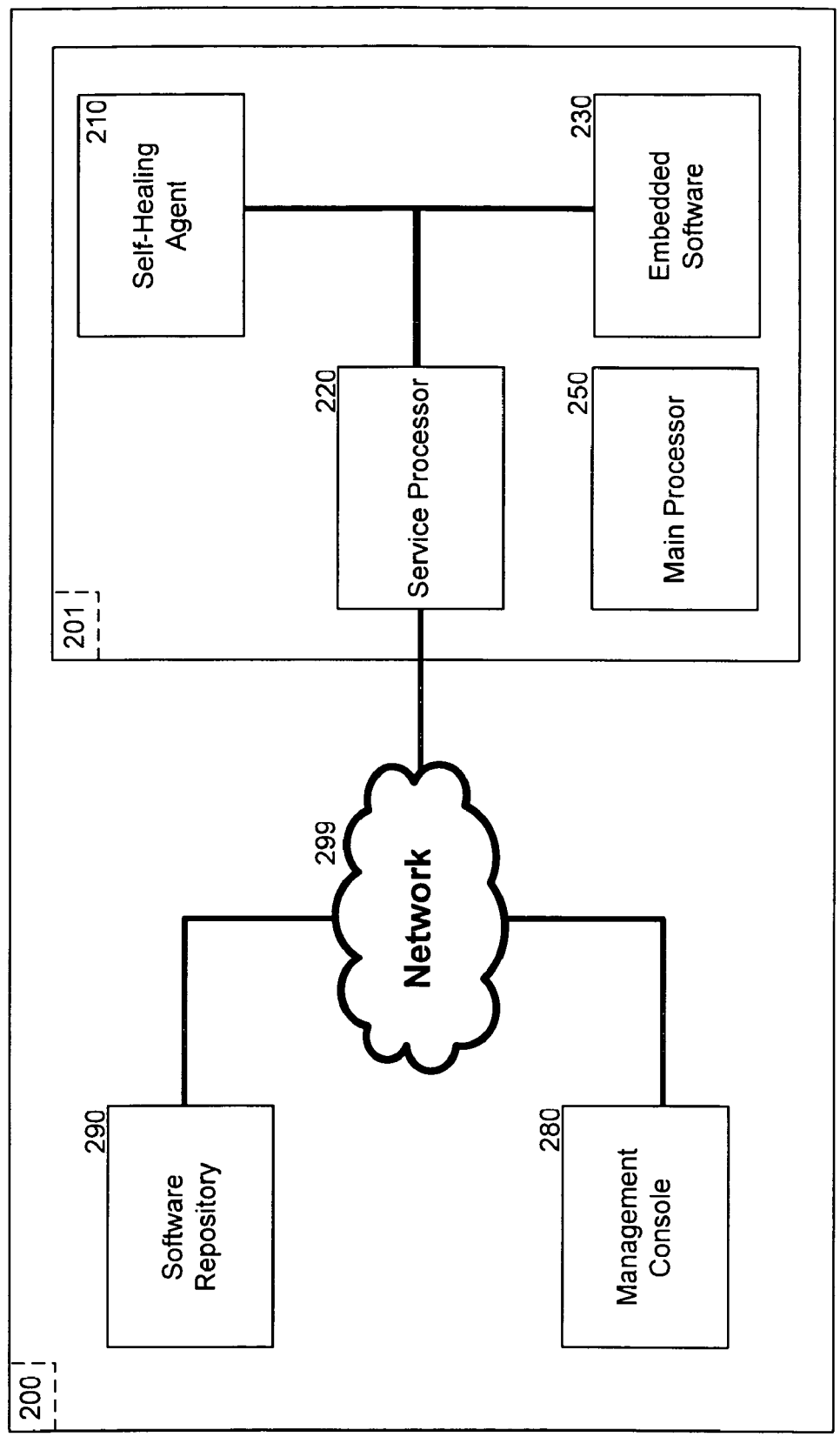
FIG. 2 is a block diagram illustrating an embodiment of a system and an apparatus capable of attempting to maintain and/or repair the embedded software components of a computer in accordance with the claimed subject matter.

FIG. 2 is a block diagram illustrating an embodiment of a system 200 and an apparatus 201 capable of attempting to maintain and/or repair the embedded software components of a computer in accordance with the claimed subject matter. In one embodiment, the apparatus may include a service processor 220, a self-healing agent 210, and at least one embedded software module 230. In one embodiment, the system may include the apparatus, a software repository 290 and a management console 280.

In one embodiment, the Main Processor 250 may be capable of executing the main operating system and computing tasks of the apparatus 201 or a computer platform. In one embodiment, the apparatus of computing platform may include a server.

In one embodiment, service processor 220 may be capable of executing the self-healing agent 210 at least semi-independently of Main Processor 250. In one embodiment, the service processor may be capable of executing, altering, and/or reading embedded software 230. In another embodiment he service processor may also be capable of functioning even when the main processor is effectively powered down or in an idle state. In one embodiment, the service processor may include a Baseboard Management Controller (BMC).

In one embodiment, the service processor may be capable of communicating with other devices via a network 299. In a specific embodiment, the service processor may utilize a network interface card (not shown) to communicate via the network. In one embodiment, the service processor may be capable of performing these various functions regardless of what operating system is used or, in another embodiment, what software is running on the main processor. In one embodiment, the service processor may be capable of performing or facilitating the technique illustrated by FIG. 1 and described above.

In one embodiment, embedded software 230 may include a software or data module or program that is a substantially integral part of the apparatus. In one embodiment, the embedded software may be stored within a flash memory, or other memory structure. In one embodiment, the embedded memory may not be conveniently accessible to the operating system during runtime. Examples of embedded software may include, but are not limited to, BIOS firmware, server management firmware, sensor data records, embedded web pages, etc. In one embodiment, the embedded software may include a plurality of embedded software or data modules.

In one embodiment, the self-healing agent 210, may be capable of attempting to update the embedded software 230 utilizing the service processor 220. In one embodiment, the self-healing agent may be stored within a flash memory or other memory structure. In another embodiment, the self-healing agent may be embedded within the apparatus 201 or the service processor. It is contemplated that, in one embodiment, the self-healing agent may be capable of performing or facilitating the technique illustrated by FIG. 1 and described above.

In one embodiment, the software repository 290 may be capable of providing a database of embedded software updates to the apparatus 201. In one embodiment, the software repository may be a single repository. Alternatively, the software repository may be a plurality of repositories, possibly utilizing different protocols, formats, and data organizations. It is also contemplated that the software repository may be within an intranet, the Internet, or a combination thereof. In one embodiment, the software repository may be capable of facilitating the actions illustrated by Blocks 110 & 125 of FIG. 1, and discussed above.

In one embodiment, the management console 280 may be capable of facilitating the functioning of the self-healing agent 210 by providing information on the updating policy of the apparatus 201. In one embodiment, the management console may include a substantially automated policy system that attempts to control at least one apparatus. In another embodiment, the console may include a means to allow user interaction with the self-healing agent. In one embodiment, the console may facilitate the actions illustrated by Blocks 110, 120, & 130 of FIG. 1, and described in detail above. In a few embodiments, the console may help determine when the agent should attempt to identify updates, whether or not the updates should be retrieved, and/or whether or not the updates should be installed.

The techniques described herein are not limited to any particular hardware or software configuration; they may find applicability in any computing or processing environment. The techniques may be implemented in hardware, software, firmware or a combination thereof. The techniques may be implemented in programs executing on programmable machines such as mobile or stationary computers, personal digital assistants, and similar devices that each include a processor, a storage medium readable or accessible by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g. compact disk read only memory (CD-ROM), digital versatile disk (DVD), hard disk, firmware, non-volatile memory, magnetic disk or similar medium or device, that is readable by a general or special purpose programmable machine for configuring and operating the machine when the storage medium or device is read by the computer to perform the procedures described herein. The system may also be considered to be implemented as a machine-readable or accessible storage medium, configured with a program, where the storage medium so configured causes a machine to operate in a specific manner. Other embodiments are within the scope of the following claims.

While certain features of the claimed subject matter have been illustrated and described herein, many modifications, substitutions, changes, and equivalents will now occur to those skilled in the art. It is, therefore, to be understood that the appended claims are intended to cover all such modifications and changes that fall within the true spirit of the claimed subject matter.

The following is claimed:

1. An article comprising:
a machine accessible storage medium having a plurality of machine accessible instructions, for attempting to optimize code layout, wherein when the instructions are executed, the instructions provide for, utilizing a service processor to:
automatically identifying an update to an embedded software, the embedded software to be executed via the service processor, the service processor separate from a main processor, the main processor to execute an operating system (OS);
retrieving the update from a software repository;
determining if the installation of the update should be deferred based, at least in part, on a signal received from a policy management system, wherein the signal refers to an occurred event;
deferring the installation of the update in response to the occurred event, wherein the occurred event includes the main processor ceasing to execute the OS and the service processor is rebooted in response to determining the installation should be deferred; and
installing the update to the embedded software in response to determining the installation should be deferred.

2. The article of claim 1, wherein the instructions providing for automatically identifying an update to an embedded software includes instructions providing for, utilizing a service processor:
processing information that indicates the version of the embedded software to be updated;
querying at least one software repository for information regarding the version of the embedded software provided by the software repository; and
determining if the version of embedded software provided by the software repository is more desirable than version of the embedded software to be updated.

3. The article of claim 1, wherein the instructions providing for, utilizing a service processor, automatically identifying an update to an embedded software includes instructions providing for alerting a user that an update is available, wherein the embedded software is included in the service processor.

4. The article of claim 1, wherein the occurred event comprises one or more of a platform either turning idle, the platform initializing, the platform shutting down, and an user-triggered event, wherein the platform includes the service processor.

5. An apparatus comprising:
at least one embedded software module;
a main processor to execute an operating system (OS);
a self-healing agent, to automatically identify an update to the embedded software module(s),
retrieve the update from a software repository,
determine if the installation of the update should be deferred based, at least in part, on a signal received from a policy management system, wherein the signal refers to an occurred event,
defer the installation of the update in response to the occurred event, wherein the occurred event includes the main processor ceasing to execute the OS and the service processor is rebooted in response to determining the installation should be deferred, and
install the update to the embedded software in response to determining the installation should not be deferred; and
a service processor capable of executing the self-healing agent and the embedded software module(s) independent from the main processor.

6. The apparatus of claim 5, wherein the self-healing agent is further to:
process information that indicates the version of the embedded software to be updated;
query at least one software repository for information regarding the version of the embedded software provided by the software repository; and
determine if the version of embedded software provided by the software repository is more desirable than version of the embedded software to be updated.

7. The apparatus of claim 5, wherein automatically identifying an update to the embedded software module(s) includes alerting a user that an update is available, wherein the embedded software module(s) are included in the service processor.

8. The apparatus of claim 5, wherein the occurred event comprises one or more of a platform either turning idle, the platform initializing, the platform shutting down, and an user-triggered event, wherein the platform includes the service processor.

9. A system comprising:
a computer platform including
a embedded software;
a main processor to execute an operating system (OS);
a service processor capable of executing a self-healing agent and the embedded software independent of the main processor; and
the self-healing agent capable of updating the embedded software, the self-healing agent to:
automatically identify an update to the embedded software module(s),
retrieve the update from a software repository,
determine if the installation of the update should be deferred based, at least in part, on a signal received from a policy management system, wherein the signal refers to an occurred event,
defer the installation of the update in response to the occurred event, wherein the occurred event includes the main processor ceasing to execute the OS and the service processor is rebooted in response to determining the installation should be deferred, and
install the update to the embedded software in response to determining the installation should not be deferred.

10. The system of claim 9, wherein the self-healing agent is further to:
process information that indicates the version of the embedded software to be updated;
query at least one software repository for information regarding the version of the embedded software provided by the software repository;
determine if the version of embedded software provided by the software repository is more desirable than version of the embedded software to be updated.

11. The system of claim 9, wherein automatically identifying an update to the embedded software module(s) includes alerting a user that an update is available, wherein the embedded software is included in the service processor.

12. The system of claim 9, wherein the occurred event comprises one or more of a platform either turning idle, the platform initializing, the platform shutting down, and an user-triggered event, wherein the platform includes the service processor.

13. A method comprising:
automatically identifying an update to an embedded software, the embedded software to be executed via the service processor, the service processor separate from a main processor, the main processor to execute an operating system (OS);
retrieving the update from a software repository;
determining if the installation of the update should be deferred based, at least in part, on a signal received from a policy management system, wherein the signal refers to an occurred event;
deferring the installation of the update in response to the occurred event, wherein the occurred event includes the main processor ceasing to execute the OS and the service processor is rebooted in response to determining the installation should be deferred; and
installing the update to the embedded software in response to determining the installation should be deferred.

14. The method of claim 12, further comprising:
processing information that indicates the version of the embedded software to be updated;
querying at least one software repository for information regarding the version of the embedded software provided by the software repository; and
determining if the version of embedded software provided by the software repository is more desirable than version of the embedded software to be updated.

15. The method of claim 13, wherein the instructions providing for automatically identifying an update to an embedded software includes instructions providing for, utilizing a service processor:
attempting to identify an update to an embedded software when an event occurs, where the event is selected from a group comprising:
the service processor is idle;
a predetermined event occurs;
a platform including the service processor is rebooting, initializing, or shutting down;
a policy management system indicates that an update may be present; and
a user indicates that a check should be made.

16. The method of claim 13, further comprising alerting a user that an update is available, wherein the embedded software is included in the service processor.

17. The method of claim 13, wherein the occurred event comprises one or more of a platform either turning idle, the platform initializing, the platform shutting down, and an user-triggered event, wherein the platform includes the service processor.

* * * * *